United States Patent
Kwag et al.

(10) Patent No.: US 11,245,694 B2
(45) Date of Patent: Feb. 8, 2022

(54) USER TERMINAL APPARATUS AND CONTROL METHOD THEREOF

(71) Applicant: SAMSUNG ELECTRONICS CO., LTD., Suwon-si (KR)

(72) Inventors: Kyung-soo Kwag, Suwon-si (KR); Ji-hoon Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 210 days.

(21) Appl. No.: 16/467,184

(22) PCT Filed: Dec. 20, 2017

(86) PCT No.: PCT/KR2017/015071
§ 371 (c)(1),
(2) Date: Jun. 6, 2019

(87) PCT Pub. No.: WO2018/117617
PCT Pub. Date: Jun. 28, 2018

(65) Prior Publication Data
US 2019/0319949 A1  Oct. 17, 2019

(30) Foreign Application Priority Data
Dec. 20, 2016 (KR) .................. 10-2016-0174578

(51) Int. Cl.
*H04L 29/06* (2006.01)

(52) U.S. Cl.
CPC ........ *H04L 63/0869* (2013.01); *H04L 63/083* (2013.01)

(58) Field of Classification Search
CPC .......... G06F 21/12; G06F 21/82; G06F 21/73; G06F 21/554; G06F 21/72; G06F 21/74; G06F 21/14; G06F 21/71; G06F 212/1408; G06F 21/45; G06F 11/30; H04L 29/06; H04L 9/32; H04L 63/0823; H04L 63/104;
(Continued)

(56) References Cited

U.S. PATENT DOCUMENTS

| | | | |
|---|---|---|---|
| 7,849,310 B2 * | 12/2010 | Watt .................. | G06F 21/52 713/164 |
| 7,886,098 B2 | 2/2011 | Kershaw et al. | |

(Continued)

OTHER PUBLICATIONS

International Search Report dated Apr. 16, 2018 by the International Searching Authority in counterpart International Patent Application No. PCT/KR2017/015071. (PCT/ISA/210).
(Continued)

*Primary Examiner* — Saleh Najjar
*Assistant Examiner* — Khalid M Almaghayreh
(74) *Attorney, Agent, or Firm* — Sughrue Mion, PLLC

(57) ABSTRACT

A user terminal apparatus may include a communication unit for communicating with a server; a memory in which applications are stored; and a processor for executing an application including a first logic which requires security processing, performing mutual verification with the server, controlling the communication unit such that a request for executing the first logic on the server is sent to the server, and when the execution result of the first logic is received from the server, proceeding with the execution of the application by using the received execution result.

14 Claims, 13 Drawing Sheets

(58) Field of Classification Search
CPC . H04L 63/065; H04L 63/083; H04L 63/0869; H04W 12/40; H04W 12/106; H04M 1/725
USPC ........ 726/2, 3, 5, 7; 713/150, 152, 155, 169, 713/181; 709/227–229, 237
See application file for complete search history.

(56) References Cited

U.S. PATENT DOCUMENTS

| | | | |
|---|---|---|---|
| 8,171,311 B2 | 5/2012 | Watt | |
| 8,775,824 B2* | 7/2014 | Kershaw | G06F 21/53 713/189 |
| 8,973,158 B2 | 3/2015 | Abraham et al. | |
| 9,118,639 B2* | 8/2015 | Phegade | G06F 9/45558 |
| 9,317,689 B2* | 4/2016 | Aissi | H04W 12/128 |
| 10,368,240 B2* | 7/2019 | Park | H04W 4/50 |
| 2004/0039906 A1* | 2/2004 | Oka | H04L 63/0823 713/156 |
| 2004/0153672 A1* | 8/2004 | Watt | G06F 21/74 726/22 |
| 2004/0243810 A1* | 12/2004 | Rindborg | G06F 21/567 713/176 |
| 2007/0044160 A1* | 2/2007 | Ishibashi | G06F 21/57 726/34 |
| 2007/0136800 A1* | 6/2007 | Chan | H04L 63/0869 726/10 |
| 2008/0040618 A1 | 2/2008 | Andersson et al. | |
| 2008/0095361 A1* | 4/2008 | Wifvesson | H04L 9/0841 380/44 |
| 2008/0172678 A1 | 7/2008 | Lee et al. | |
| 2009/0292929 A1* | 11/2009 | Henry | G06F 21/554 713/189 |
| 2010/0145854 A1 | 6/2010 | Messerges et al. | |
| 2011/0093567 A1* | 4/2011 | Jeon | G06F 9/5072 709/219 |
| 2012/0284506 A1* | 11/2012 | Kravitz | G06Q 40/00 713/151 |
| 2013/0212575 A1* | 8/2013 | Ito | G06F 21/53 718/1 |
| 2013/0347064 A1* | 12/2013 | Aissi | H04W 12/35 726/2 |
| 2014/0094232 A1 | 4/2014 | Framel et al. | |
| 2014/0258717 A1 | 9/2014 | Baek et al. | |
| 2014/0365781 A1* | 12/2014 | Dmitrienko | G06F 21/34 713/185 |
| 2015/0089502 A1 | 3/2015 | Horovitz et al. | |
| 2016/0094573 A1* | 3/2016 | Sood | H04L 63/0428 713/156 |
| 2016/0134602 A1 | 5/2016 | Poornachandran et al. | |
| 2016/0142890 A1 | 5/2016 | Drazdovskyy et al. | |
| 2016/0203649 A1* | 7/2016 | Berkobin | G06Q 30/0609 705/13 |
| 2016/0254904 A1* | 9/2016 | Hjelm | H04L 9/006 713/155 |
| 2016/0283409 A1* | 9/2016 | Pandey | G06F 21/53 |
| 2018/0013569 A1* | 1/2018 | Knopf | H04L 9/088 |
| 2019/0005233 A1* | 1/2019 | Schneider | G06F 8/30 |

OTHER PUBLICATIONS

Written Opinion dated Apr. 16, 2018 by the International Searching Authority in counterpart International Patent Application No. PCT/KR2017/015071. (PCT/ISA/237).

* cited by examiner

USER TERMINAL APPARATUS AND CONTROL METHOD THEREOF

TECHNICAL FIELD

The disclosure relates to a user terminal apparatus and a control method thereof. More specifically, the disclosure relates to a user terminal apparatus that is capable of using a trusted execution environment based on cloud even in a user terminal apparatus having a low specification, and a control method thereof.

BACKGROUND ART

With the development of IT technologies, kinds of services that can be executed through a user terminal apparatus are increasing. Also, services using information to be protected such as personal information, financial information, copyright information, etc. are also increasing. Accordingly, there is also an increasing demand for security processing of important information.

In the case of a security solution that relies only on software, there is a problem that, if software (or a kernel) having the highest authority is attacked, all authorities and data are exposed. For complementing this problem, a method of providing a trusted execution environment based on hardware was suggested.

A trusted execution environment based on hardware has an advantage that a separated execution environment is provided, and even if a kernel is attacked, safety can be secured. However, there is also a problem that, in order to construct a trusted execution environment based on hardware, a user terminal apparatus should have a high specification, and the cost for manufacturing increases.

DISCLOSURE

Technical Problem

The disclosure is for addressing the aforementioned problem, and is aimed at providing a user terminal apparatus that enables use of services for which security is important by providing a trusted execution environment without addition of hardware even in a user terminal apparatus having a low specification, and a control method thereof.

Technical Solution

A user terminal apparatus according to an embodiment of the disclosure for achieving the aforementioned purpose may include a communication unit configured to communicate with the server, a memory storing an application, and a processor configured to execute the application including a first logic which requires security processing, perform mutual verification with the server, control the communication unit to request the server such that the first logic is executed at the server, and based on an execution result being received from the server, proceed with execution of the application by using the received execution result.

Also, the first logic may include a hash value of a second logic which does not require security processing included in the application. The server may compare the hash value of the second logic with a hash value measured at the user terminal apparatus and verify the user terminal apparatus. Meanwhile, the processor may measure the hash value of the second logic, and control the communication unit to transmit the measured hash value to the server.

In addition, the processor may verify the server by using a certification, and control the communication unit to form a security channel between the verified server.

Meanwhile, a second server forming a cloud network with the server may transmit a first secret value which is a result of a hash operation of a first nonce when the server is verified. The server may perform a hash operation of both the first secret value and a second nonce and generate a second secret value. Meanwhile, the processor may control the communication unit to transmit the first nonce to the second server, and control the communication unit to transmit the second nonce to the server. Also, based on receiving the generated second secret value from the server, the processor may verify the server by using the first nonce and the second nonce.

Meanwhile, the application may be generated by performing binary processing on source codes depending on whether security processing is required.

Also, the server may execute the first logic by using a security chip.

Further, the processor may transmit the first logic to the server if execution of the first logic is required while the application is executed, and control the communication unit to request execution of the transmitted first logic.

Also, the first logic may be pre-installed on the server, and if execution of the first logic is required while the application is executed, the processor may control the communication unit to request execution of the pre-installed first logic.

In addition, the application may include the first logic and the second logic which does not require security processing. The processor may execute the second logic in parallel while waiting for receipt of an execution result after requesting execution of the first logic to the server.

Also, the user terminal apparatus according to an embodiment of the disclosure may further include an input unit configured to receive an input of a user instruction. Also, when the processor receives a request for a user instruction related to execution of the first logic from the server, the processor may control the communication unit to transmit the user instruction inputted through the input unit to the server.

Meanwhile, a method for controlling a user terminal apparatus according to an embodiment of the disclosure for achieving the aforementioned purpose may include the steps of executing an application including a first logic which requires security processing, performing mutual verification with the server, requesting the server such that the first logic is executed at the server, and based on an execution result being received from the server, proceeding with execution of the application by using the received execution result.

Also, the first logic may include a hash value of a second logic which does not require security processing included in the application. Meanwhile, the step of performing mutual verification may include the step of measuring the hash value of the second logic, and the step of transmitting the measured hash value to the server. The server may compare the hash value of the second logic included in the first logic with the measured hash value and verify the user terminal apparatus.

Also, the step of performing mutual verification may include the step of verifying the server by using a certification, and the step of forming a security channel between the verified server.

In addition, the step of performing mutual verification may include the steps of transmitting a first nonce to a second server forming a cloud network with the server, transmitting a second nonce to the server, and based on receiving a second secret value from the server, verifying the server by using the first nonce and the second nonce. The second server may transmit a first secret value which is a result of a hash operation of the first nonce to the server when the server is verified. The server may perform a hash operation of both the first secret value and the second nonce and generate the second secret value.

Meanwhile, the application may be generated by performing binary processing on source codes depending on whether security processing is required.

Also, the server may execute the first logic by using a security chip.

Meanwhile, the step of requesting may include the step of transmitting the first logic to the server if execution of the first logic is required while the application is executed, and the step of requesting execution of the transmitted first logic.

Also, the first logic may be pre-installed on the server, and in the step of requesting, if execution of the first logic is required while the application is executed, execution of the pre-installed first logic may be requested.

In addition, the application may include the first logic and the second logic which does not require security processing. Meanwhile, the method for controlling a user terminal apparatus according to an embodiment of the disclosure may further include the step of executing the second logic in parallel while waiting for receipt of an execution result after requesting execution of the first logic to the server.

Further, the method for controlling a user terminal apparatus according to an embodiment of the disclosure may further include the step of, based on receiving a request for a user instruction related to execution of the first logic from the server, receiving input of a user instruction and transmitting the user instruction to the server.

Advantageous Effects

According to the various embodiments of the disclosure as described above, a trusted execution environment can be provided even in a user terminal apparatus having a low specification where there is no trusted execution environment based on hardware. Also, through mutual verification of a user terminal apparatus and a server, stability (or safety) can be secured while a cloud environment is used. In addition, security over a certain level can be provided regardless of the performance of each user terminal apparatus.

BEST MODE

Hereinafter, preferred embodiments of the disclosure will be described in detail with reference to the accompanying drawings. In describing the disclosure, in case it is determined that detailed explanation of related known functions or features may unnecessarily confuse the gist of the disclosure, the detailed explanation will be omitted. Also, the terms that will be described below are terms defined in consideration of their functions in the disclosure, and the definition may vary according to the user, operator, or court decisions. Therefore, the definition should be made based on the overall content of this specification.

Meanwhile, terms including ordinal numbers such as the first, the second, and the like may be used to describe various elements, but the elements are not limited by the terms. Such terms are used only to distinguish one element from another element. For example, a first element may be called a second element, and a second element may be called a first element in a similar manner, without departing from the scope of protection of the disclosure. Also, the term and/or includes a combination of a plurality of related items, or any one item among a plurality of related items.

The terms used in this specification are used only to explain the embodiments, and are not intended to restrict and/or limit the disclosure. Also, singular expressions include plural expressions, unless defined obviously differently in the context. Further, in this specification, terms such as include or have should be construed as designating that there are such characteristics, numbers, operations, elements, components or a combination thereof in the specification, but not as excluding the existence or possibility of adding one or more of other characteristics, numbers, operations, elements, components or a combination thereof.

Meanwhile, in the embodiments, 'a module' or 'a unit' may perform at least one function or operation, and may be implemented as hardware or software, or as a combination of hardware and software. Further, a plurality of 'modules' or 'units' may be integrated into at least one module and implemented as at least one processor, excluding 'a module' or 'a unit' that needs to be implemented as specific hardware.

Hereinafter, the disclosure will be described in detail with reference to the accompanying drawings.

Figure 1:
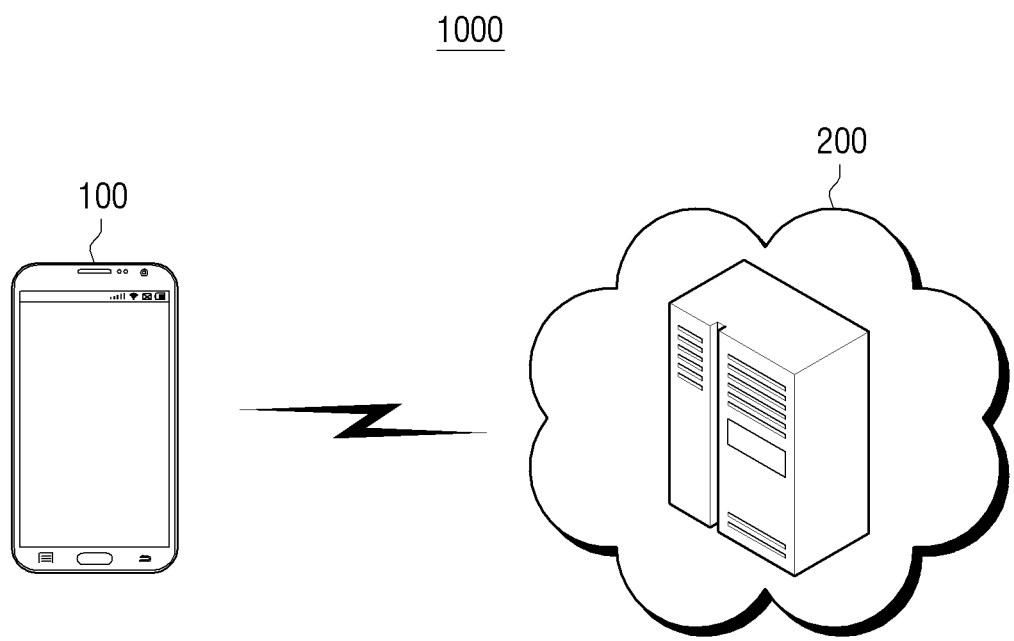
FIG. 1 is a conceptual diagram illustrating a trusted execution environment system according to an embodiment of the disclosure.

FIG. 1 is a conceptual diagram illustrating a trusted execution environment system (a TEE system) 1000 according to an embodiment of the disclosure. Referring to FIG. 1, a TEE system 1000 may include a user terminal apparatus 100 and a server 200.

The user terminal apparatus 100 may be an electronic apparatus that does not provide a trusted execution environment based on hardware. For example, the user terminal apparatus 100 may be implemented as various apparatuses such as a smartphone, a wearable device, a PC, a tablet, an IoT device, etc.

For the convenience of explanation, description will be made based on the assumption that the user terminal apparatus 100 is an apparatus having a low specification. However, an apparatus where there is a trusted execution environment based on hardware may also be the user terminal apparatus 100 described in the disclosure. Even if there is a trusted execution environment based on hardware, the user terminal apparatus 100 may be interlocked with the server 200 for being provided with an additional trusted execution environment.

The server 200 may include a trusted execution environment based on hardware. In the embodiment of FIG. 1, the server 200 was illustrated as a single server device, but the server 200 may be configured as a plurality of server devices included in a cloud network. Also, on the server 200, applications and the like may be installed, and web-based software services may be provided to a user.

In a development stage of an application, portions of a source code that are important in terms of security may be classified as a critical logic, and the other portions may be classified as a non-critical logic. A compiler may generate an application having a binary logic structure divided into a critical logic and a non-critical logic.

For example, in case the user terminal apparatus 100 provides a payment service, an application providing the payment service may consist of a critical logic and a non-critical logic. A payment approval logic using an account number, a password, and biometric information may be a critical logic which requires security. Meanwhile, a logic displaying a payment result to a user may be a non-critical logic which does not necessarily require security.

As another example, in case the user terminal apparatus 100 provides an image reproducing service, an application providing the image reproducing service may also consist of a critical logic and a non-critical logic. A logic related to digital rights management (DRM) may be a critical logic. Meanwhile, a logic of processing an image signal and reproducing the signal may be a non-critical logic.

The user terminal apparatus 100 may execute a non-critical logic which is not an important portion in terms security in the logic structure of an application. Meanwhile, the server 200 may execute a critical logic which is important in terms of security. For example, the user terminal apparatus 100 may transmit a critical logic to the server 200, and thereby enable a critical logic to be executed in a trusted execution environment (TEE). As another example, only a non-critical logic may be installed on the user terminal apparatus 100, and a critical logic may be installed on the server 200. The user terminal apparatus 100 may transmit a request for execution of a critical logic to the server 200, and the server 200 may execute a critical logic in a trusted execution environment (TEE).

Figure 2:
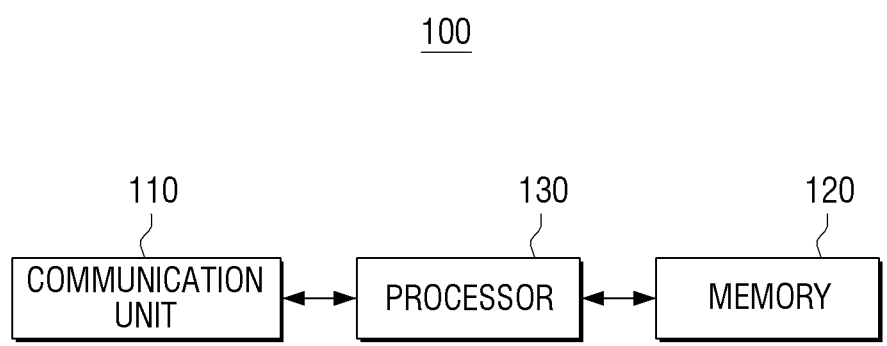
FIG. 2 is a block diagram schematically illustrating a configuration of a user terminal apparatus according to an embodiment of the disclosure.

FIG. 2 is a block diagram schematically illustrating a configuration of a user terminal apparatus 100 according to an embodiment of the disclosure. Referring to FIG. 2, the user terminal apparatus 100 may include a communication unit 110, a memory 120, and a processor 130.

The communication unit 110 may communicate with a server 200. For example, the communication unit 110 may form a security channel with the server 200, and transmit and receive data, a control signal, etc. through the security channel formed.

Also, the communication unit 110 may transmit a critical logic which requires security processing, a request for execution of a critical logic, a hash value of a non-critical logic, etc. to the server 200. Then, the communication unit 110 may receive an execution result of a critical logic, etc. from the server 200.

The memory 120 may store a plurality of applications that can provide various services to a user.

The processor 130 may execute an application stored in the memory 120. For example, the application may consist of a critical logic which requires security processing and a non-critical logic which is regardless of whether security processing is performed.

If execution of a critical logic is needed while the application is executed, the processor 130 may perform mutual verification with the server 200. As a critical logic should be executed through the server 200, the user terminal apparatus 100 and the server 200 may mutually verify whether they are trustable apparatuses before execution of a critical logic.

For example, the user terminal apparatus 100 may verify the server 200 by using a certification. Also, the user terminal apparatus 100 may verify the server 200 by using a second server 300 which belongs to the same cloud network as the server 200.

For example, the server 200 may verify the user terminal apparatus 100 by using a hash value which is a result of a hash operation of a non-critical logic. In a development stage of the application, a hash value of a non-critical logic may be included in a critical logic. The server 200 may compare a hash value included in a critical logic with the hash value which is measured and transmitted by the user terminal apparatus 100, and verify whether the user terminal apparatus 100 is a trustable apparatus.

When mutual verification of the user terminal apparatus 100 and the server 200 is completed, the processor 130 may control the communication unit 110 to transmit a request for execution of a critical logic to the server 200. For example, a request for execution transmitted to the server 200 may include only a signal requesting execution, or a signal requesting execution and a critical logic to be executed may be included together. The server 200 may execute a critical logic, and transmit the execution result to the user terminal apparatus 100.

When the execution result of a critical logic is received, the processor 130 may execute the remaining a non-critical logic by using the received execution result of a critical logic. If there is a non-critical logic that can be executed regardless of the result of a critical logic, the processor 130 may execute a non-critical logic in parallel while the request for execution of a critical logic and reception of the execution result are performed.

As described above, the processor 130 may make portions requiring security performed in a trusted execution environment (TEE), and execute the remaining portions by itself while executing an application. Accordingly, there is an advantage that the processor 130 may use a trusted execution environment (TEE) based on hardware even in the case of being implemented as an apparatus having a low specification (e.g., a CPU having a low specification). Also, the processor 130 may secure safety and confidentiality through mutual verification with the server 200.

Figure 3:
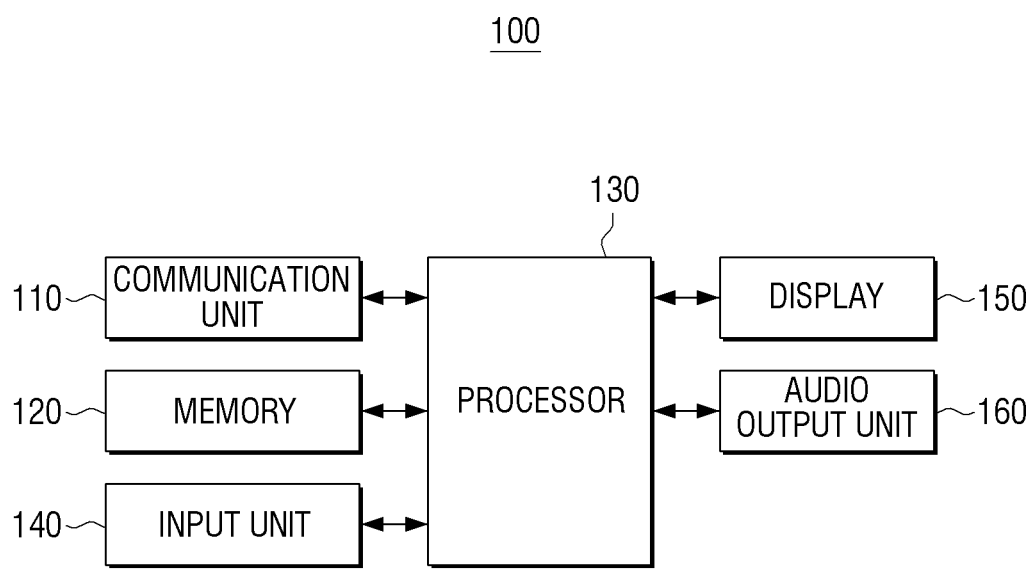
FIG. 3 is a block diagram illustrating a detailed configuration of a user terminal apparatus according to an embodiment of the disclosure.

FIG. 3 is a block diagram illustrating a detailed configuration of a user terminal apparatus 100 according to an embodiment of the disclosure. Referring to FIG. 3, the user terminal apparatus 100 may include a communication unit 110, a memory 120, a processor 130, an input unit 140, a display 150, and an audio output unit 160. In addition to the components illustrated in the embodiment of FIG. 3, the user terminal apparatus 100 may include various components such as an image reception unit (not shown), an image processing unit (not shown), a power supply (not shown), etc. Also, it is obvious that the user terminal apparatus 100 is not limited to be implemented while necessarily including all the components illustrated in FIG. 3.

The communication unit 110 may perform communication with an external apparatus like the server 200. The communication unit 110 may transmit and receive logic of an application, a control signal, data, etc. to and from an external apparatus. Also, the communication unit 110 may verify the server 200 by using a certification, and form a security channel with the server 200 through a secure connection protocol. For example, the communication unit 110 may exchange information such as a session identifier and setting of a password with the server 200. Also, the communication unit 110 may verify the certification of the server 200, and generate a session key by using a public key included in the certification. The server 200 may also generate a session key by using the information transmitted from the communication unit 110. As the user terminal apparatus 100 and the server 200 have the same session key, the communication unit 110 may generate a security communication channel using a symmetric key password.

For this, the communication unit 110 may include various communication modules like a near field wireless communication module (not shown) and a wireless communication module (not shown). Here, a near field wireless communication module is a module for performing communication with an external apparatus located within a short distance, according to a near field wireless communication method such as BLUETOOTH and ZIGBEE. Meanwhile, a wireless communication module is a module that is connected to an external network according to a wireless communication protocol such as WIFI, WIFI direct, and IEEE, and performs communication. In addition to the above, a wireless communication module may further include mobile communication modules that are connected to a mobile communication network according to various mobile communication standards such as 3rd Generation (3G), 3rd Generation Partnership Project (3GPP), Long Term Evolution (LTE), LTE Advanced (LTE-A), and the like, and perform communication.

Also, the communication unit 110 may perform communication with an external apparatus according to a wired communication method. For example, the communication unit 110 may use High Definition Multimedia Interface (HDMI), Low Voltage Differential Signaling (LVDS), Local Area Network (LAN), etc. as wired communication methods.

The memory 120 may store various modules, software, applications, and data for operating the user terminal apparatus 100. For example, the memory 120 may store an application generated in a binary structure according to whether security processing is required.

Meanwhile, the memory 120 is a storage medium wherein various programs, etc. necessary for operating the user terminal apparatus 100 are stored, and it may be implemented in the form of flash memory, a Hard Disk Drive (HDD), a Solid State Drive (SSD), and the like. For example, the memory 120 may include ROM for storing a program for performing an operation of the user terminal apparatus 100, and RAM for temporarily storing data according to performing of an operation of the user terminal apparatus 100.

The input unit 140 receives input of various user instructions for controlling the user terminal apparatus 100. For example, in case user instructions such as selection of a menu and identification of execution should be input while an application is executed, the user terminal apparatus 100 may receive input of user instructions through the input unit 140. As another example, if a user instruction is requested from the server 200, the processor 130 may control the communication unit 110 to transmit a user instruction inputted through the input unit 140 to the server 200.

Meanwhile, the input unit 140 may be implemented as a button, a motion recognition device, a voice recognition device, a touch pad, and the like. In case the input unit 140 is implemented as a touch pad, it may be implemented in the form of a touch screen that is combined with the display 150 and constitutes an interlayer structure. A touch screen may detect the location and area of a touch input, the pressure of a touch input, and the like.

The display 150 may display an execution result of an application, information, a UI, a content, etc. provided at the user terminal apparatus 100. For example, the display 150 may display an execution screen of an application.

Further, the display 150 may be implemented as a liquid crystal display device (a Liquid Crystal Display (LCD)), an organic electroluminescent diode (an Organic Light Emitting Display (OLED)), or a Plasma Display Panel (PDP), etc., and may display various screens that can be provided through the user terminal apparatus 100. Also, the display 150 may be implemented in various forms such as a curved display and a flexible display, as well as a flat panel display.

The audio output unit 160 may output audio. For example, the audio output unit 160 may output not only various types of audio data, but also an execution result of an application, notification sound, a voice message, etc. In case the user terminal apparatus 100 according to an embodiment of the disclosure provides an interactive voice recognition function, the audio output unit 160 may be used as a component for outputting an execution result of a function together with the display 150. Also, the audio output unit 160 may be accommodated inside the user terminal apparatus 100, or it may be implemented in the form of an output port such as a jack.

The processor 130 may control the aforementioned components of the user terminal apparatus 100. For example, if execution of a critical logic is required, the processor 130 may control the communicator 110 to transmit a request for execution of a critical logic to the server 200.

Meanwhile, the processor 130 may be implemented as a single CPU, and perform execution of a non-critical logic, execution of a critical logic in an application, verification of the server 200, etc. Alternatively, the processor 130 may be implemented as a plurality of processors, and an IP performing a specific function.

In case a critical logic for which security processing should be performed needs to be executed while an application is executed, the processor 130 may make the logic for which security processing should be performed executed in a trusted execution environment (TEE) provided at the server 200. In contrast, in case a non-critical logic which does not necessarily require security processing needs to be executed, the processor 130 may directly perform a non-critical logic.

Before requesting the server 200 to execute a critical logic, the processor 130 may secure safety by verifying the server 200. The server 200 may also verify the user terminal apparatus 100. That is, the user terminal apparatus 100 and the server 200 may secure stability (or safety) and confidentiality by performing mutual verification.

For example, the processor 130 may verify the server 200 by using a certification. A certification performs the role of guaranteeing that the server 200 accessed by the user terminal apparatus 100 is the server that the user terminal apparatus 100 intended to access. By using a certification, the processor 130 may construct secure connection with the server 200.

As another example, the processor 130 may verify the server 200 by using a second server 300 included in the same cloud network as the server 200 that will be requested to execute a critical logic. Also, the processor 130 may control the communication unit 110 to transmit different nonces to the server 200 and the second server 300. A nonce refers to unique and random string data which means a number used once. The second server 300 may verify the server 200 belonging to the same cloud network. When verification of the server 200 is completed, the second server 300 may transmit a hash value which is a result of a hash operation of the nonce received from the user terminal apparatus 100 to the server 200. Then, the server 200 may perform a hash operation of both the nonce received from the user terminal apparatus and the hash value received from the second server 300, and transmit the operated hash value to the user terminal apparatus 100. The processor 130 may verify the server 200 through the hash value received from the server 200.

The two kinds of methods suggested as methods for the user terminal apparatus 100 to verify the server 200 may be selectively used, or the two methods may be used together.

The server 200 may also verify the user terminal apparatus 100. For example, a critical logic may include an integrity value for a non-critical logic. Integrity for a non-critical logic may be a hash value which is a result of a hash operation of a non-critical logic. The user terminal apparatus 100 may transmit the measured integrity value which is a result of a hash operation of the stored non-critical logic to the server 200. The server 200 may compare the integrity value for the received or stored non-critical logic included in the critical logic with the measured integrity value received from the user terminal apparatus 100, and verify the user terminal apparatus 100.

A more detailed method for using a trusted execution environment using cloud and a method for mutual verification of the user terminal apparatus 100 and the server 200 will be described again with reference to the drawings below.

Figure 4A:
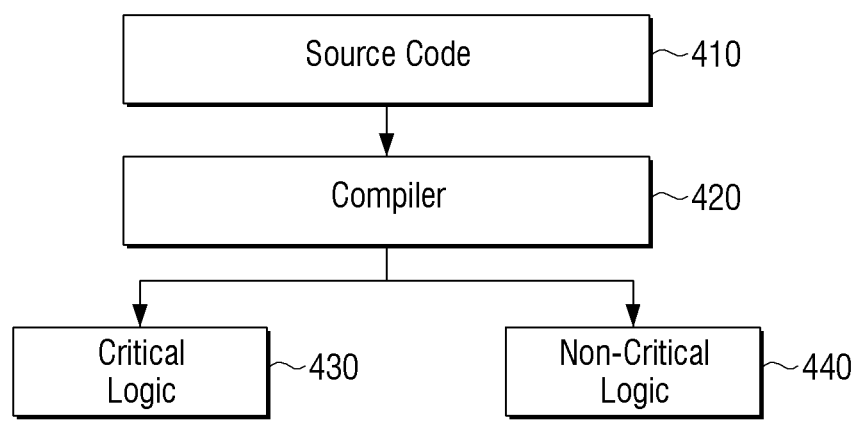
FIG. 4A and FIG. 4B are diagrams for illustrating a logic configuration of an application.
Figure 4B:
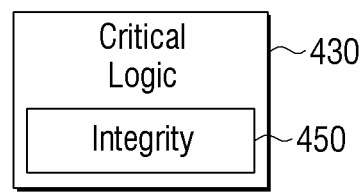

FIGS. 4A and 4B are diagrams for illustrating a logic configuration in a development stage of an application. Referring to FIG. 4A, a developer may prepare a source code 410 for an application. Here, for a portion that is important in terms of security in the source code 410, an indication indicating that the portion is a critical logic may be added. A compiler 420 may compile the source code and generate an application file. The compiler 420 may generate an application which is divided in a binary manner into a critical logic 430 and a non-critical logic 440 by using an indication included in the source code. That is, an application may be a program that is generated by performing binary processing depending on whether security processing on source codes is required.

FIG. 4B is a diagram for illustrating that the critical logic 430 is configured such that the server 200 may verify the user terminal apparatus 100. An integrity value (Integrity) 450 included in the critical logic 430 is an integrity value for the non-critical logic 440. For example, an integrity value may be calculated through a hash operation.

As the critical logic 430 executed at the server 200 includes an integrity value 450 for the non-critical logic 440 executed at the user terminal apparatus 100, the server 200 may verify the user terminal apparatus 100. Detailed content in this regard will be described below.

Figure 5:
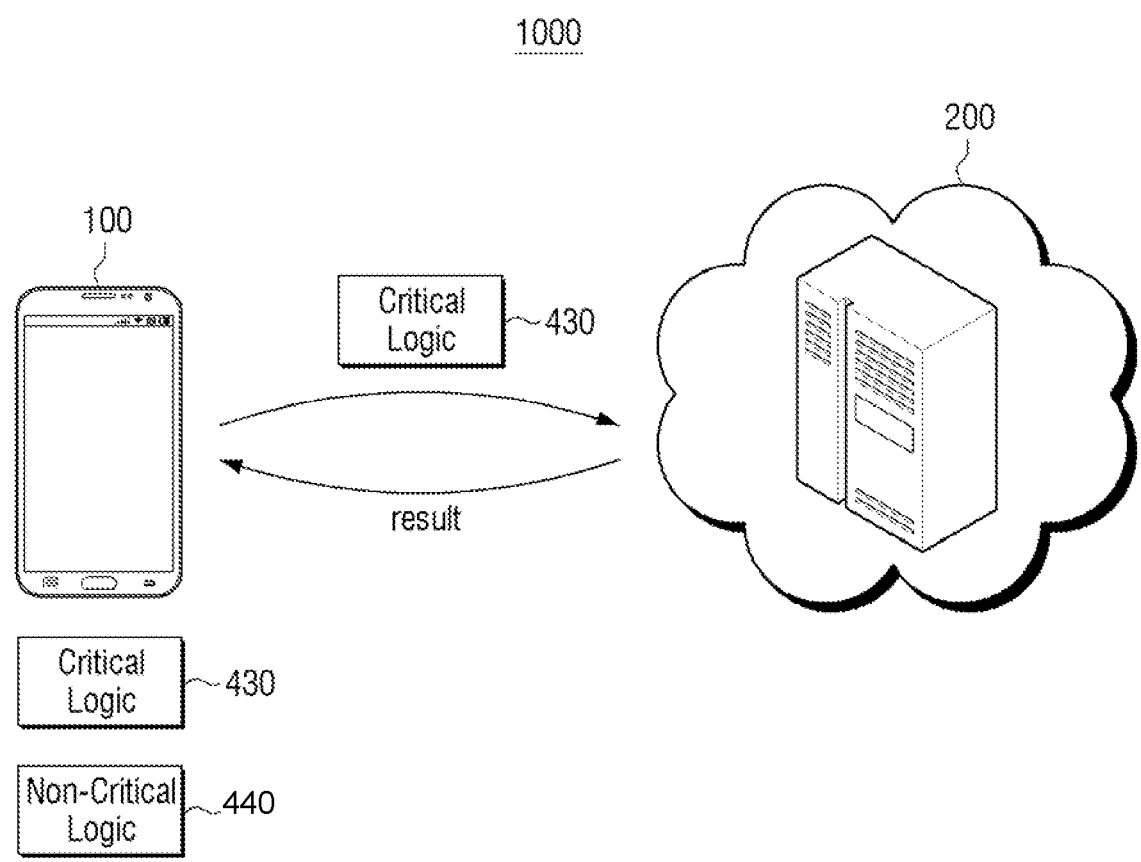
FIG. 5 is a diagram for illustrating an operation of a trusted execution environment system according to an embodiment of the disclosure.

FIG. 5 is a diagram for illustrating an operation of a trusted execution environment system 1000 according to an embodiment of the disclosure. The trusted execution environment system 1000 may include a user terminal apparatus 100 and a server 200. In the embodiment illustrated in FIG. 5, both of the critical logic 430 and the non-critical logic 440 may be installed on the user terminal apparatus 100. The user terminal apparatus 100 may be an apparatus having a low specification which is not capable of providing a trusted execution environment (TEE) based on hardware. Meanwhile, the server 200 may be an apparatus which is capable of providing a trusted execution environment by using hardware like a security chip.

If execution of the critical logic 430 is required while an application is executed, the user terminal apparatus 100 may transmit the critical logic 430 to the server 200. Then, the server 200 may execute the received critical logic 430 in a trusted execution environment. Also, the server 200 may transmit the execution result of the critical logic 430 to the user terminal apparatus 100.

Figure 6:
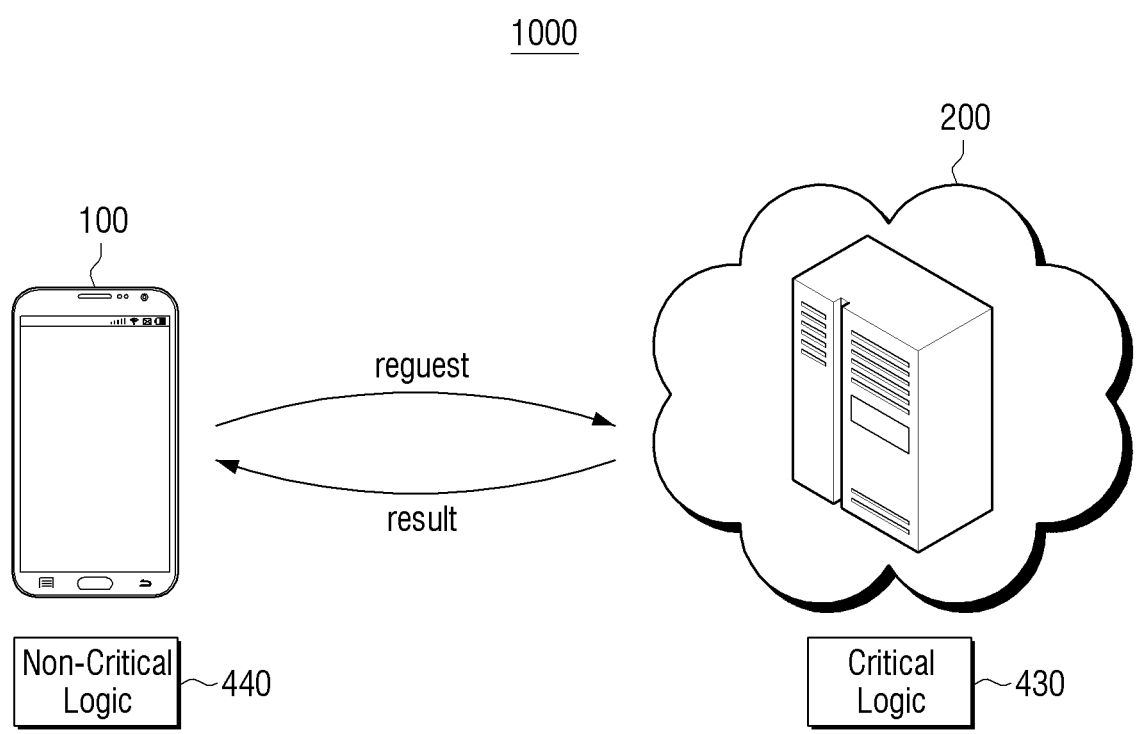
FIG. 6 is a diagram for illustrating an operation of a trusted execution environment system according to another embodiment of the disclosure.

FIG. 6 is a diagram for illustrating an operation of a trusted execution environment system 1000 according to another embodiment of the disclosure. The trusted execution environment system 1000 may include a user terminal apparatus 100 and a server 200. The user terminal apparatus 100 may be an apparatus having a low specification which is not capable of providing a trusted execution environment (TEE) based on hardware. Meanwhile, the server 200 may be an apparatus which is capable of providing a trusted execution environment by using hardware like a security chip.

In the embodiment illustrated in FIG. 6, the non-critical logic 440 may be installed on the user terminal apparatus 100. Meanwhile, the critical logic 430 may be installed on the server 200. The developer may register the critical logic 430 at the server 200 such that it is executed only based on cloud when distributing an application. Also, the developer may distribute an application including only a non-critical logic 440 to a general user. That is, the user terminal apparatus 100 according to the embodiment of FIG. 6 has a characteristic that a logic which requires security processing is fundamentally not installed.

If execution of the critical logic 430 is required while an application is executed, the user terminal apparatus 100 may request the server 200 to execute the critical logic 430. The server 200 that received a request for execution may execute the pre-installed critical logic 430 in a trusted execution environment. Also, the server 200 may transmit the execution result of the critical logic 430 to the user terminal apparatus 100.

Figure 7:
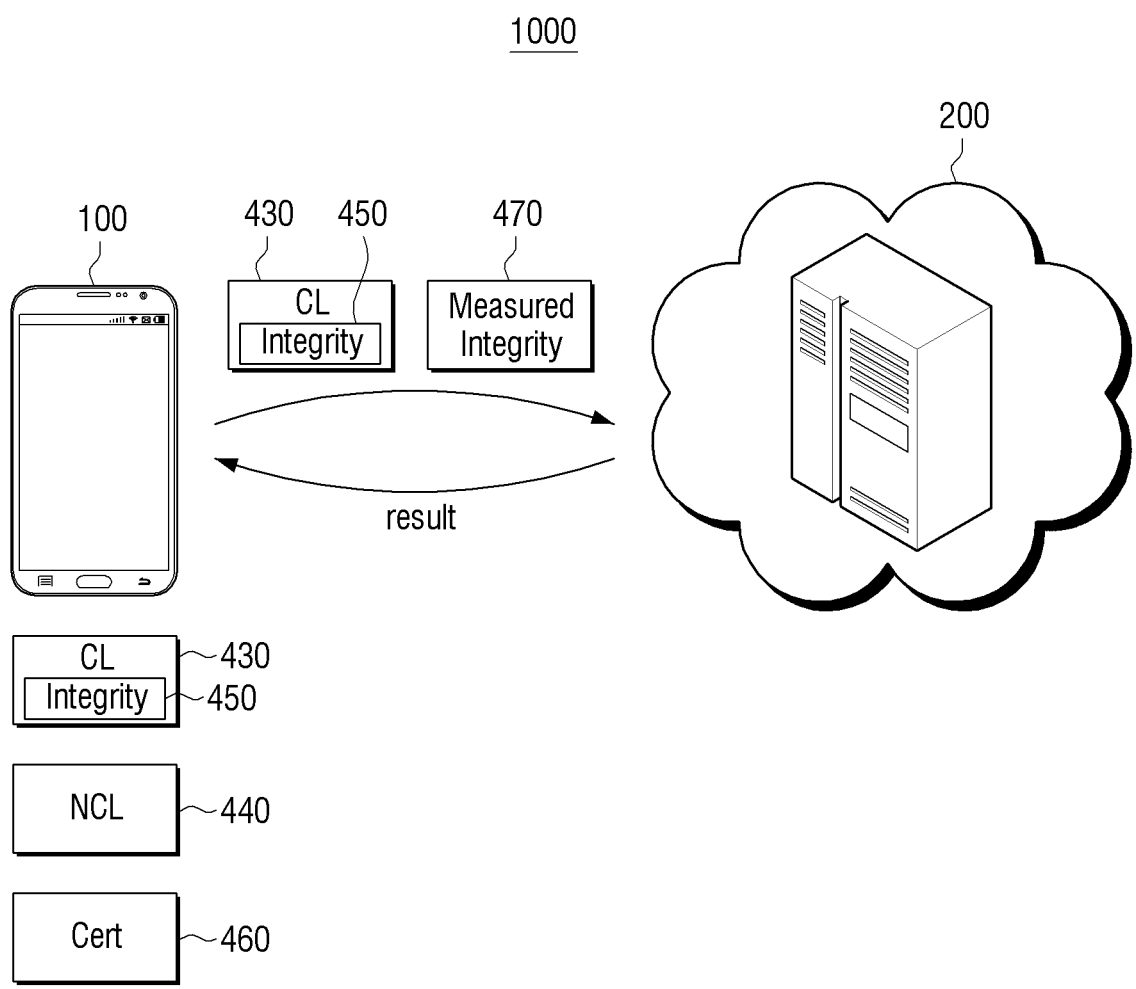
FIG. 7 is a diagram for illustrating a mutual verification operation of a user terminal apparatus and a server according to an embodiment of the disclosure.

FIG. 7 is a diagram for illustrating a mutual verification operation of a user terminal apparatus 100 and a server 200 according to an embodiment of the disclosure. The embodiment of the trusted execution system 1000 illustrated in FIG. 7 corresponds to the embodiment of the trusted execution system 1000 illustrated in FIG. 5.

On the user terminal apparatus 100, the critical logic 430, non-critical logic 440 and certification 460 of an application may be installed. Also, the critical logic 430 may include an integrity value 450 of the non-critical logic.

The user terminal apparatus 100 may verify the server 200 by using the certification 460, and form a security channel between the verified server 200.

If execution of the critical logic 430 is required while an application is executed, the user terminal apparatus 100 may transmit the critical logic 430 including the integrity value 450 of the non-critical logic 440 to the server 200. Also, the user terminal apparatus 100 may measure integrity for the non-critical logic 440 installed. Further, the user terminal apparatus 100 may transmit the measured integrity value (Measured Integrity) 470 together with the critical logic 430 to the server 200.

For example, the integrity value may be a hash value which was derived by performing a hash operation on the logic. In the development stage, the critical logic 430 included an integrity value 450 corresponding to the hash value of the non-critical logic 440, and thus the server 200 may compare the measured integrity value 470 with the integrity value 450 included in the critical logic 430, and verify whether the user terminal apparatus 100 is a trustable apparatus. If the non-critical logic 440 installed on the user terminal apparatus 100 is deformed or damaged, the measured integrity value 470 which is a result of a hash operation of the deformed or damaged non-critical logic 440 becomes different from the integrity value 450 measured in the development stage.

As the critical logic 430 which is installed on or transmitted to the server 200 for being executed in a trusted execution environment (TEE) includes the integrity value 450 of the non-critical logic 440 of which reliability is guaranteed, the server 200 may verify the user terminal apparatus 100. Accordingly, even if hacking is performed while the user of the user terminal apparatus 100 is not aware of it, security can be maintained as the server 200 verifies the user terminal apparatus 100.

After mutual verification between the user terminal apparatus 100 and the server 200 is completed, the server 200 may execute the critical logic 430 in a trusted execution environment (TEE) based on hardware. Then, the server 200 may transmit the execution result to the user terminal apparatus 100.

Figure 8:
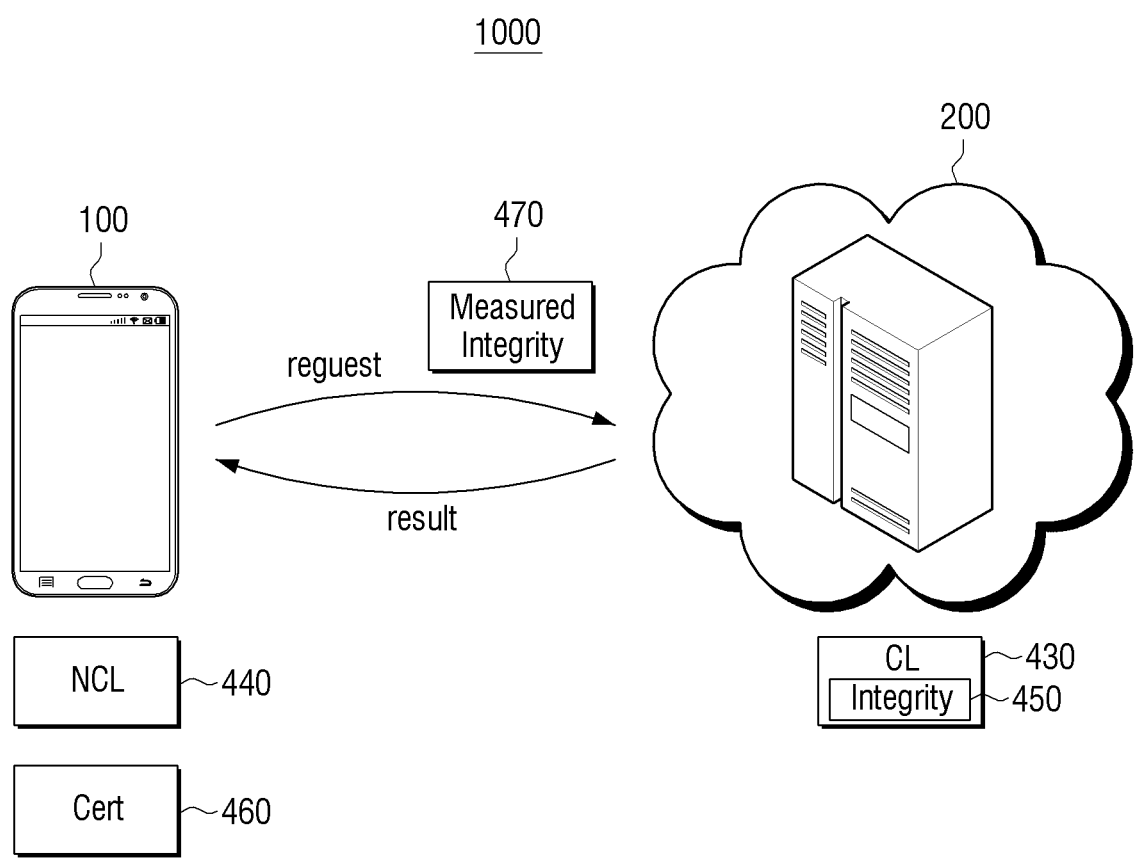
FIG. 8 is a diagram for illustrating a mutual verification operation of a user terminal apparatus and a server according to another embodiment of the disclosure.

FIG. 8 is a diagram for illustrating a mutual verification operation of a user terminal apparatus 100 and a server 200 according to another embodiment of the disclosure. The embodiment of the trusted execution system 1000 illustrated in FIG. 8 corresponds to the embodiment of the trusted execution system 1000 illustrated in FIG. 6.

On the user terminal apparatus 100, a non-critical logic 440 of an application and a certification 460 may be installed. On the server 200, a critical logic 430 of the application may be installed. Also, the critical logic 430 may include an integrity value 450 of the non-critical logic.

The user terminal apparatus 100 may verify the server 200 by using the certification 460, and form a security channel between the verified server 200.

In addition, the user terminal apparatus 100 may execute the application. The application installed on the user terminal apparatus 100 may include only the non-critical logic 440. After verifying the server 200 through the certification 460, the user terminal apparatus 100 may measure integrity for the non-critical logic 440 installed.

If execution of the critical logic 430 is required while the application is executed, the user terminal apparatus 100 may transmit the measured integrity value (Measured Integrity) 470 to the server 200. Also, the user terminal apparatus 100 may request the server 200 to execute the critical logic 430.

As described in the embodiment of FIG. 7, in the development stage, the critical logic 430 included an integrity value 450 corresponding to the hash value of the non-critical logic 440, and thus the server 200 may compare the integrity value 470 measured by the user terminal apparatus 100 with the integrity value 450 included in the critical logic 430, and verify whether the user terminal apparatus 100 is a trustable apparatus.

After mutual verification between the user terminal apparatus 100 and the server 200 is completed, the server 200 may execute the pre-installed critical logic 430 in a trusted execution environment (TEE) based on hardware. Then, the server 200 may transmit the execution result to the user terminal apparatus 100.

Figure 9:
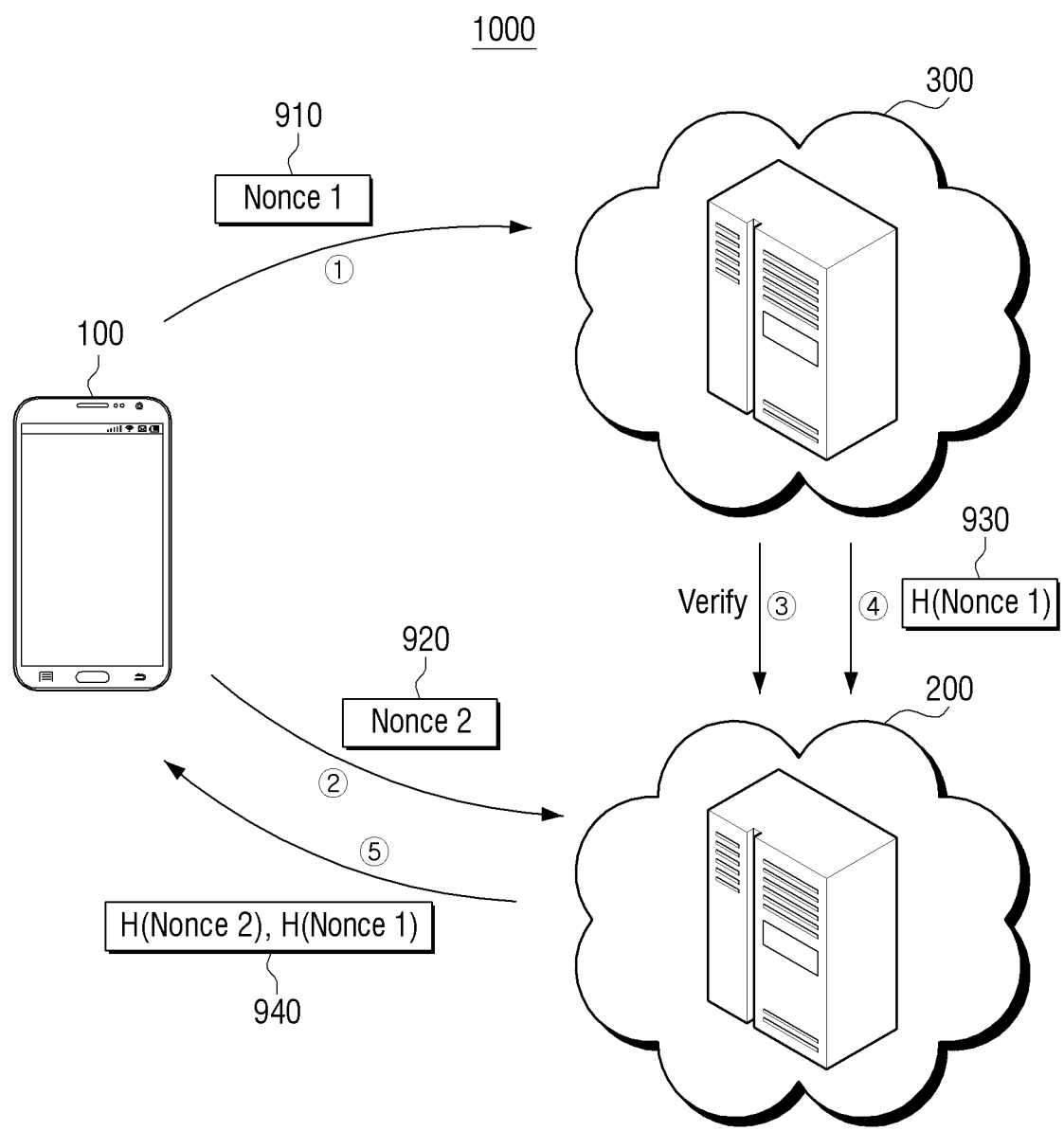
FIG. 9 is a diagram for illustrating a server verification operation of a user terminal apparatus using a plurality of servers.

FIG. 9 is a diagram for illustrating a server 200 verification operation of a user terminal apparatus 100 using a plurality of servers. In the embodiments of FIGS. 7 and 8, a method for a user terminal apparatus 100 to verify a server 200 through a certification 460 was described. Meanwhile, in the embodiment of FIG. 9, the server 200 and a second server 300 may belong to the same cloud network. The server 200 is an apparatus that directly executes the logic requested from the user terminal apparatus 100 through a trusted execution environment (TEE) based on hardware, and the second server 300 may simply be an apparatus that belongs to the same cloud network as the server 200. Also, the second server 300 is an apparatus that is used only for the user terminal apparatus 100 to verify the server 200, and is an apparatus that does not directly provide a trusted execution environment to the user terminal apparatus 100. Of course, the server 200 and the second server 300 were divided only for the convenience of explanation, and all servers 200, 300 belonging to the cloud network to which the user terminal 100 accesses may provide a trusted execution environment to the user terminal apparatus 100.

Further, the user terminal apparatus 100 may transmit a first nonce (Nonce1) 910 to the second server 300 (①). Also, the user terminal apparatus 100 may transmit a second nonce (Nonce2) 920 to the server 200 that will provide a trusted execution environment (②). As a nonce is unique and random string data, the first nonce and the second nonce have different values.

The second server 300 that does not directly provide a trusted execution environment may verify the server 200 that directly provides a trusted execution environment (③). When the server 200 is identified as trustable, the second server 300 may transmit a hash value (H(Nonce1)) 930 which is a result of a hash operation of the received first nonce (Nonce1) 910 to the server 200 (④). Here, the hash value 930 may also be referred to as a first secret value.

The server 200 may perform a hash operation of both the first secret value (H(Nonce1)) 930 received from the second server 300 and the second nonce (Nonce2) 920 received from the user terminal apparatus 100. Then, the server 200 may transmit a second secret value (H(Nonce2), H(Nonce1)) 940 for which a hash operation was performed to the user terminal apparatus 100 (⑤).

As the user terminal apparatus 100 is aware of the first nonce (Nonce1) 910 and the second nonce (Nonce2) 920, the user terminal apparatus 100 may perform a hash operation in the same way as the process of obtaining the second secret value 940. Also, by comparing the hash value for which a hash operation was performed with the second secret value 940 received from the server 200, the user terminal apparatus 100 may verify whether the server 200 is a trustable apparatus.

The method for the user terminal apparatus 100 to verify the server 200 according to the embodiment of FIG. 9 may also verify a case where the second server 300 belonging to the same cloud network as the server 200 is not trustable. Accordingly, the user terminal apparatus 100 may verify not only the server 200 that directly provides a trusted execution environment but also the cloud network including the server 200. Thus, the user terminal apparatus 100 may provide a trusted environment which is more trustable to a user.

Figure 10:
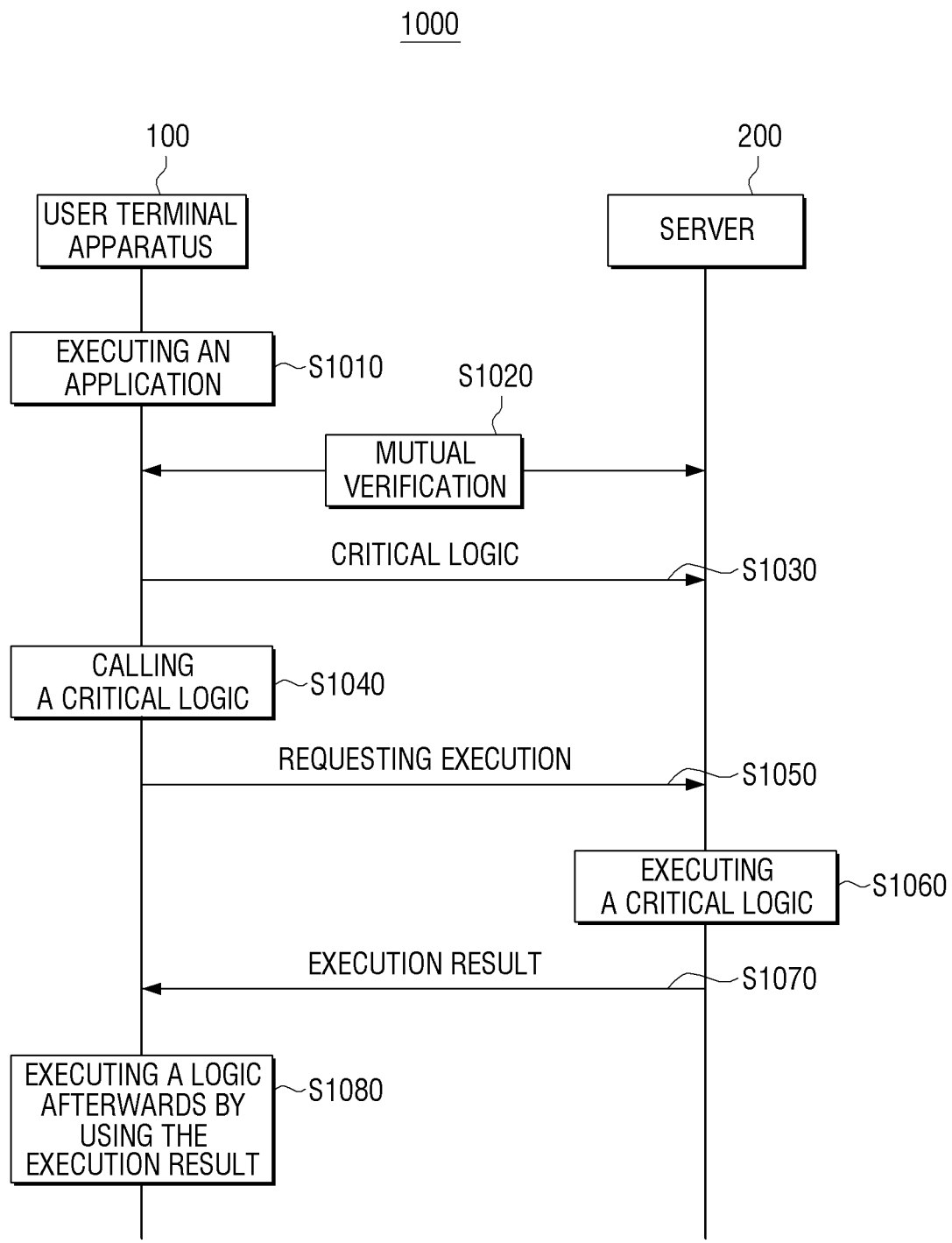
FIG. 10 and FIG. 11 are sequence diagrams for illustrating an operation of a trusted execution environment system according to various embodiments of the disclosure.
Figure 11:
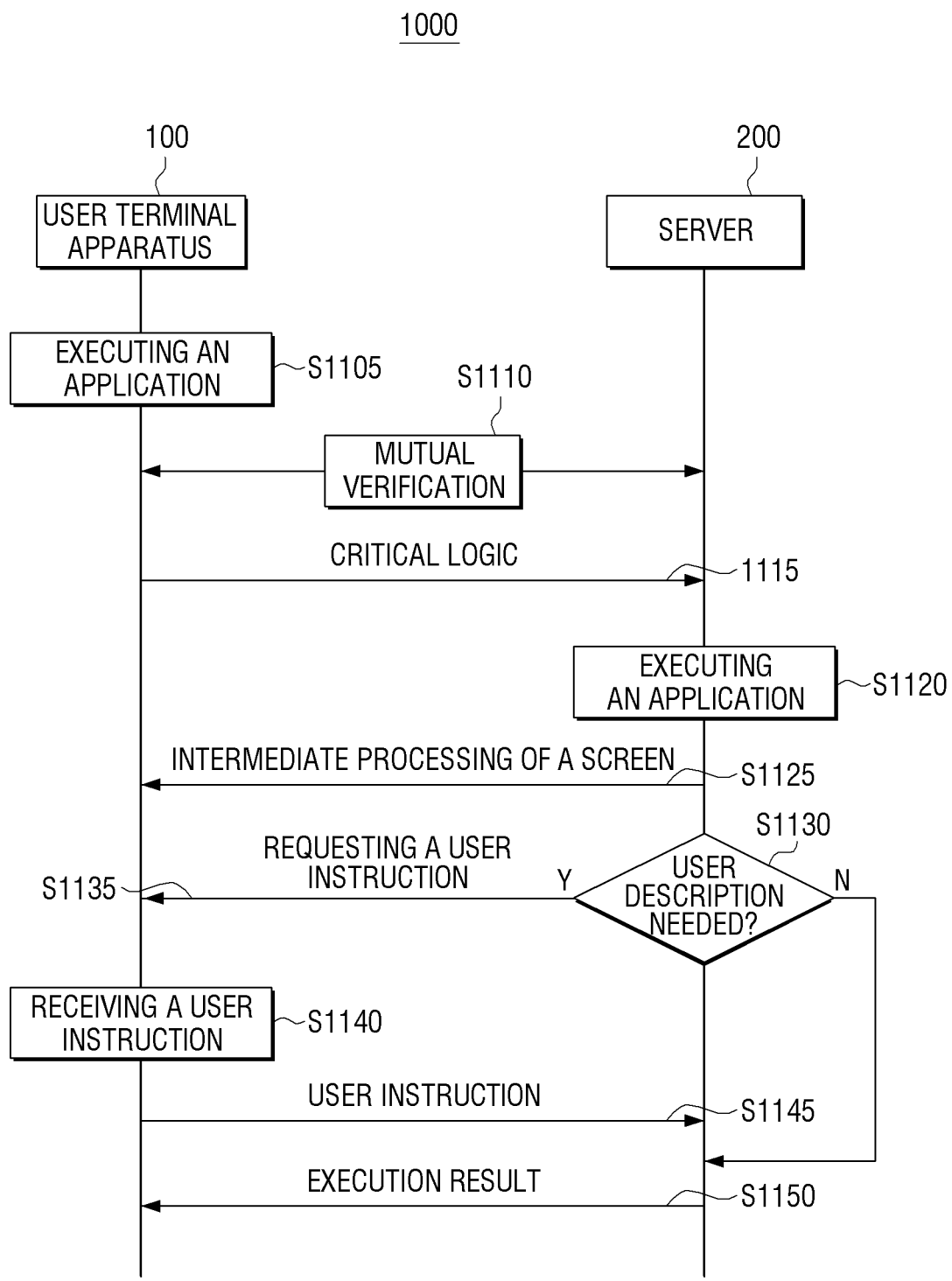

FIGS. 10 and 11 are sequence diagrams for illustrating an operation of a trusted execution environment system 1000 according to various embodiments of the disclosure.

Referring to FIG. 10, the user terminal apparatus 100 may execute an application at operation S1010. Also, the user terminal apparatus 100 may verify whether the server 200 that will provide a trusted execution environment and the user terminal apparatus 100 are apparatuses that may trust each other at operation S1020. For example, the user terminal apparatus 100 and the server 200 may verify reliability of each other by using a hash operation.

If it is verified that the server 200 is trustable, the user terminal apparatus 100 may transmit the critical logic of an application that should be executed in a trusted execution environment to the server 200 at operation S1030. Meanwhile, in an embodiment where a critical logic is installed on the server 200, the operation S1030 may be omitted.

If execution of the critical logic is required while the application is executed, the user terminal apparatus 100 may call the critical logic at operation S1040. When the critical logic is called, the user terminal apparatus 100 may request the server 200 to execute the critical logic at operation S1050. For example, the user terminal apparatus 100 may request the server 200 to execute the critical logic synchronously. In this case, the user terminal apparatus 100 may wait until execution of the critical logic is completed at the server 200. As another example, the user terminal apparatus 100 may request the server 200 to execute the critical logic asynchronously. In this case, the user terminal apparatus 100 may execute a non-critical logic in parallel, while waiting for the server 200 to transmit the execution result of the critical logic.

The server 200 that received a request for synchronous or asynchronous execution may execute the critical logic in a trusted execution environment based on hardware at operation S1060. Then, the server 200 may transmit the execution result of the critical logic to the user terminal apparatus 100 at operation S1070. When the execution result of the critical logic is received, the user terminal apparatus 100 may execute a non-critical logic afterwards by using the received execution result at operation S1080.

In the embodiment of FIG. 10, it was expected that execution of the critical logic is requested only once, for the convenience of explanation. However, operations after transmission of the critical logic to the server after mutual verification is completed may be performed repeatedly. That is, the operations S1040 to S1080 wherein the user terminal apparatus 100 requests the server 200 to execute the critical logic and receives the execution result may be performed repeatedly.

FIG. 11 illustrates an embodiment in case a user instruction (selection, identification of execution, etc.) is necessary while a critical logic is executed at the server 200. Referring to FIG. 11, the user terminal apparatus 100 may execute an application at operation S1105. Then, the user terminal apparatus 100 may verify whether the server 200 that will provide a trusted execution environment and the user terminal apparatus 100 are apparatuses that may trust each other at operation S1110. The trusted execution environment system 1000 may provide a safer trusted environment through a mutual verification process between the user terminal apparatus 100 and the server 200.

If it is verified that the server 200 is trustable, the user terminal apparatus 100 may transmit the critical logic of an application that should be executed in a trusted execution environment to the server 200 at operation S1115. Meanwhile, in an embodiment where a critical logic is installed on the server 200, the operation S1115 may be omitted.

If it is verified that the user terminal apparatus 100 is trustable, the server 200 may also execute an application at operation S1120. The application executed at the server 200 may be a pre-installed application including a critical logic, or it may be an application including a critical logic received from the user terminal apparatus 100.

While executing the application, the server 200 may transmit data regarding the intermediate processing, an execution screen, etc. to the user terminal apparatus 100 at operation S1125. The user terminal apparatus 100 may provide a process of executing the application to a user in real time, by using components such as the display 150 and the audio output unit 160.

Also, in case a user instruction is necessary while the application is executed at operation S1130-Y, the server 200 may request the user terminal apparatus 100 to receive input of a user instruction and provide the user instruction at operation S1135. In addition, if a situation where a user's determination is necessary occurs, such as a case where a system call is necessary, the server 200 may communicate with the user terminal apparatus 100 and request a user instruction.

The user terminal apparatus 100 may receive a user instruction at operation S1140. For example, the user terminal apparatus 100 may display a UI providing items for selection, and receive a user instruction selecting one of the items provided from the user. As another example, the user terminal apparatus 100 may display a UI for inputting a password, and receive input of a password from the user. Meanwhile, information of the password may be information consisting of numbers, or biometric information such as the fingerprint and iris of the user.

Also, the user terminal apparatus 100 may transmit the received user instruction to the server 200 at operation S1145. The server 200 may proceed with execution of the application by using the received user instruction. When execution of the application is completed, the server 200 may transmit the execution result to the user terminal apparatus 100 at operation S1150.

In the embodiment of FIG. 11, it was expected that a user instruction is requested only once, for the convenience of explanation. However, operations after transmission of the critical logic to the server after mutual verification is completed may be performed repeatedly. That is, the operations S1120 to S1150 wherein the server 200 requests a user instruction to the user terminal apparatus 100, and the user terminal apparatus 100 receives the user instruction and transmits the instruction to the server 200, and the server 200 transmits the execution result to the user terminal apparatus 100 may be performed repeatedly.

Figure 12:
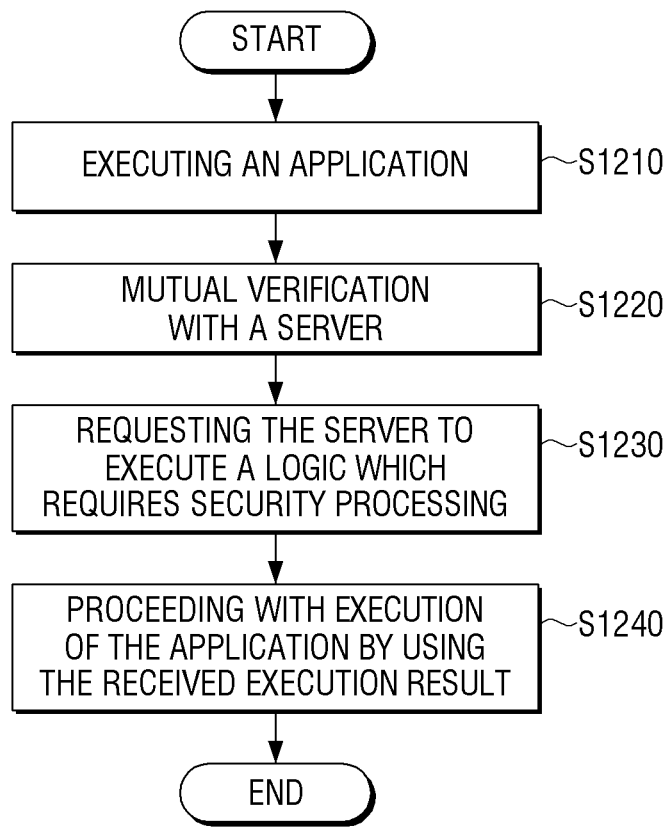
FIG. 12 is a flow chart for illustrating a method for controlling a user terminal apparatus interlocked with a server according to an embodiment of the disclosure.

FIG. 12 is a flow chart for illustrating a method for controlling a user terminal apparatus 100 interlocked with a server 200 according to an embodiment of the disclosure. Referring to FIG. 12, the user terminal apparatus 100 may execute an application at operation S1210. For example, an application may consist of a first logic which requires security processing and a second logic which does not necessarily require security processing.

Also, the user terminal apparatus 100 may perform mutual verification with the server 200 regarding whether they are apparatuses that may trust each other at operation S1220. For example, the user terminal apparatus 100 may verify the server 200 by using a certification. In addition, the user terminal apparatus 100 may also verify the server 200 by using a second server 300 belonging to the same cloud network as the server 200.

For example, the user terminal apparatus 100 may measure a hash value of the second logic and transmit the value to the server 200. Then, the server 200 may compare the measured hash value of the second logic received from the user terminal apparatus 100 with the hash value of the second logic included in the first logic, and verify the user terminal apparatus 100.

When mutual verification with the server 200 is completed, the user terminal apparatus 100 may request the server 200 to execute the first logic which requires security processing at operation S1230. In response thereto, the server 200 may execute the first logic which requires security processing in a trusted execution environment based on hardware. Then, the server 200 may transmit the execution result of the first logic to the user terminal apparatus 100.

For example, if execution of the first logic is required while an application is executed, the user terminal apparatus 100 may transmit the first logic to the server 200. Then, the user terminal apparatus 100 may request the server 200 to execute the transmitted first logic.

As another example, the first logic may have been installed on the server 200 in advance. On the server 200, various applications may be installed for providing web-based services. If execution of the first logic is required while an application is executed, the user terminal apparatus 100 may request the server 200 to execute the pre-installed first logic.

When the execution result of the first logic which requires security processing is received from the server 200, the user terminal apparatus 100 may proceed with execution of the application by using the received execution result at operation S1240. For example, the user terminal apparatus 100 may wait until the execution result is received from the server 200. Then, when the execution result is received from the server 200, the user terminal apparatus 100 may proceed with execution of the application by using the result.

As another example, the second logic which does not necessarily require security processing may be performed in parallel while the first logic is executed at the server 200. The user terminal apparatus 100 may proceed with execution of the application by using the execution result of the first logic received from the server 200, and the execution result of the second logic performed in parallel.

In the embodiment of FIG. 12, operations after transmission of the critical logic to the server after mutual verification is completed may be performed repeatedly. That is, the operations S1230 to S1240 wherein the user terminal apparatus 100 requests the server 200 to execute a logic which requires security processing, and proceeds with execution of the application by using the execution result received from the server 200 may be performed repeatedly.

According to the aforementioned various embodiments of the disclosure, the same trusted execution environment can be provided regardless of the performance of a user terminal apparatus, as long as communication with a cloud network is possible. Also, security can be provided to a user through mutual verification between a user terminal apparatus and a server, generation of a security communication channel, etc.

In addition, as a trusted execution environment based on hardware does not have to be necessarily included in a user terminal apparatus, portability of a wearable device, an IoT device, etc. can be maintained, and at the same time, services which require security processing can be provided safely.

The methods described above may be implemented in the form of program instructions that can be performed through various computer means, and be recorded in computer-readable media. The computer-readable media may include program instructions, data files, data structures, and the like as single entities or in combination. Also, program instructions recorded in the media may be instructions that are specifically designed or constructed for the disclosure, or may be those known and available to people skilled in the art in the field of computer software. Examples of computer-readable recording media include magnetic media like a hard disk, a floppy disk, and a magnetic tape, optical media like a CD-ROM and a DVD, magneto-optical media like a floptical disk, and hardware devices that are specifically constructed to store and perform program instructions like ROM, RAM, and flash memory. Meanwhile, examples of program instructions include not only machine language codes that are made by a compiler, but also high level language codes that can be executed by a computer by using an interpreter, etc. Hardware devices like the above may be constructed to operate as at least one software module for performing the operations in the disclosure, and the same is true vice versa.

While the disclosure has been described with reference to limited embodiments and drawings as above, it should be noted that the disclosure is not limited to the aforementioned embodiments, and various amendments and modifications may be made from the descriptions of the disclosure by those having ordinary skill in the art to which the disclosure belongs. Therefore, the scope of the disclosure is not to be defined while being limited to the embodiments described above, but by the appended claims and the equivalents of the claims.

What is claimed is:
1. A user terminal apparatus comprising:
   a communication interface configured to communicate with a server;
   a memory storing an application; and
   a processor configured to:
   execute the application including a first logic which requires security processing and a second logic which is different from the first logic;
   perform verification on the server;
   perform a hash operation on the second logic to obtain a measured hash value;
   transmit, to the server via the communication interface, the measured hash value and information to execute the first logic such that the first logic is executed at the server, wherein the first logic includes a reference hash value of the second logic; and
   based on an execution result of the first logic being received from the server, proceed with execution of the second logic included in the application by using the received execution result;
   wherein a second server forming a cloud network with the server is configured to transmit a first secret value which is a result of a hash operation of a first nonce when the server is verified;

the server is configured to perform a hash operation of both the first secret value and a second nonce and generates a second secret value; and the processor is configured to control the communication interface to transmit the first nonce to the second server, and control the communication interface to transmit the second nonce to the server, and based on receiving the generated second secret value from the server, verify the server by using the first nonce and the second nonce.

2. The user terminal apparatus of claim 1,
wherein the server is configured to compare the reference hash value of the second logic with the measured hash value and verify the user terminal apparatus.

3. The user terminal apparatus interlocked with a server of claim 1,
wherein the processor is configured to verify the server by using a certification, and control the communication interface to form a security channel between the verified server.

4. The user terminal apparatus interlocked with a server of claim 1,
wherein the application is generated by performing binary processing on source codes depending on whether security processing is required.

5. The user terminal apparatus of claim 1,
wherein the server is configured to execute the first logic by using a security chip.

6. The user terminal apparatus of claim 1,
wherein the processor is configured to transmit the first logic to the server if execution of the first logic is required while the application is executed, and control the communication interface to request execution of the transmitted first logic.

7. The user terminal apparatus of claim 1,
wherein the first logic is pre-installed on the server, and the processor is configured to control the communication interface to request execution of the pre-installed first logic if execution of the first logic is required while the application is executed.

8. The user terminal apparatus interlocked with a server of claim 1,
wherein the application includes the first logic and the second logic which does not require security processing, and
the processor is configured to execute the second logic in parallel while waiting for receipt of an execution result after requesting execution of the first logic to the server.

9. The user terminal apparatus of claim 1, further comprising:
an input unit configured to receive an input of a user instruction; and wherein the processor is configured to control the communication interface, based on receiving a request for a user instruction related to execution of the first logic from the server, to transmit the user instruction inputted through the input unit to the server.

10. The user terminal apparatus of claim 1, wherein the reference hash value is a result of a hash operation performed on a reference version of the second logic.

11. A method for controlling a user terminal apparatus communicating with a server comprising:
executing an application including a first logic which requires security processing and a second logic which is different from the first logic;
performing verification on the server;
perform a hash operation on the second logic to obtain a measured hash value;
transmitting the measured hash value and information to execute the first logic to the server such that the first logic is executed at the server, wherein the first logic includes a reference hash value of the second logic; and
based on an execution result of the first logic being received from the server, proceeding with execution of the second logic included in the application by using the received execution result,
wherein the performing verification comprises:
transmitting a first nonce to a second server forming a cloud network with the server;
transmitting a second nonce to the server; and
based on receiving a second secret value from the server, verifying the server by using the first nonce and the second nonce, and
wherein the second server transmits a first secret value which is a result of a hash operation of the first nonce to the server when the server is verified, and
wherein the server performs a hash operation of both the first secret value and the second nonce and generates the second secret value.

12. The method for controlling a user terminal apparatus of claim 11,
wherein the server compares the reference hash value with the measured hash value and verifies the user terminal apparatus.

13. The method for controlling a user terminal apparatus of claim 11,
wherein the performing mutual verification comprises:
verifying the server by using a certification; and
forming a security channel between the verified server.

14. The method for controlling a user terminal apparatus of claim 11,
wherein the application is generated by performing binary processing on source codes depending on whether security processing is required.

* * * * *